(12) United States Patent
Chen et al.

(10) Patent No.: US 11,386,699 B2
(45) Date of Patent: Jul. 12, 2022

(54) IMAGE PROCESSING METHOD, APPARATUS, STORAGE MEDIUM, AND ELECTRONIC DEVICE

(71) Applicant: GUANGDONG OPPO MOBILE TELECOMMUNICATIONS CORP., LTD., Guangdong (CN)

(72) Inventors: Yan Chen, Guangdong (CN); Yaoyong Liu, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 12 days.

(21) Appl. No.: 16/900,141

(22) Filed: Jun. 12, 2020

(65) Prior Publication Data

US 2020/0302154 A1    Sep. 24, 2020

Related U.S. Application Data

(63) Continuation of application No. PCT/CN2018/120108, filed on Dec. 10, 2018.

(30) Foreign Application Priority Data

Jan. 10, 2018    (CN) .......................... 201810024320.9

(51) Int. Cl.
G06V 40/16        (2022.01)
G06V 10/24        (2022.01)
G06V 10/20        (2022.01)

(52) U.S. Cl.
CPC .......... *G06V 40/165* (2022.01); *G06V 10/243* (2022.01); *G06V 10/255* (2022.01); *G06V 40/169* (2022.01)

(58) Field of Classification Search
CPC ........... G06K 9/00248; G06K 9/00275; G06K 9/3241; G06K 9/3275; G06K 9/00288;
(Continued)

(56) References Cited

U.S. PATENT DOCUMENTS 6,031,539 A    2/2000   Kang
8,290,278 B2 * 10/2012  Matsuzaka ............. G06K 9/621
                                                      382/190
(Continued)

FOREIGN PATENT DOCUMENTS

CN    101719270 A    6/2010
CN    101799919 A    8/2010
(Continued)

OTHER PUBLICATIONS

International Search Report in the international application No. PCT/CN2018/120108, dated Mar. 14, 2019.
(Continued)

*Primary Examiner* — Phuoc Tran
(74) *Attorney, Agent, or Firm* — Ladas & Parry LLP (57) ABSTRACT

An image processing method, an apparatus, a storage medium, and an electronic device are provided. The image processing method comprises: identifying a human face area in a target image (101); determining a local area to be processed from the human face area on the basis of a trained convolutional neural network model (102); obtaining posture information of a human face in the target image (103); selecting a target sample human face image from a human face image data base according to the posture information (104); and correcting the local area according to the target sample human face image (105).

20 Claims, 7 Drawing Sheets

(58) Field of Classification Search
CPC .. G06K 9/6274; G06K 9/4628; G06K 9/6256; G06V 40/165; G06V 10/243; G06V 10/255; G06V 40/169; G06V 10/454; G06V 10/82; G06V 40/172

See application file for complete search history.

(56) References Cited

U.S. PATENT DOCUMENTS

| | | | |
|---|---|---|---|
| 8,406,519 | B1 | 3/2013 | Lim |
| 9,799,096 | B1 | 10/2017 | De La Torre et al. |
| 10,380,788 | B2 * | 8/2019 | Martinez ................. G06T 7/55 |
| 10,509,952 | B2 * | 12/2019 | Kastaniotis ........ G06K 9/00295 |
| 2016/0210500 | A1 | 7/2016 | Feng et al. |

FOREIGN PATENT DOCUMENTS

| | | |
|---|---|---|
| CN | 102043943 A | 5/2011 |
| CN | 102043968 A | 5/2011 |
| CN | 102893418 A | 9/2012 |
| CN | 102722698 A | 10/2012 |
| CN | 102902961 A | 1/2013 |
| CN | 102982520 A | 3/2013 |
| CN | 103310415 A | 9/2013 |
| CN | 103577815 A | 2/2014 |
| CN | 104574321 A | 4/2015 |
| CN | 105046250 A | 11/2015 |
| CN | 104786041 A | 7/2016 |
| CN | 105741229 A | 7/2016 |
| CN | 106023063 A | 10/2016 |
| CN | 106127147 A | 11/2016 |
| CN | 106599817 A | 4/2017 |
| CN | 108558025 A | 4/2017 |
| CN | 108650574 A | 5/2017 |
| CN | 107663978 A | 1/2018 |
| GN | 102486608 A | 6/2012 |

OTHER PUBLICATIONS

Dong Guo et al., "Digital face makeup by example", 2009 IEEE Conference on Computer Vision and Pattern Recognition, Aug. 18, 2009, p. 73-79.

Neel Joshi et al., "Personal photo enhancement using example images", ACM Transactions on Graphics, vol. 29, No. 2, Apr. 21, 2010, p. 1-15.

Takayoshi Yamashita et al., "Facial point detection using convolutional neural network transferred from a heterogeneous task", 2015 IEEE International Conference on Image Processing (ICIP) Aug. 30, 2018. p. 2725-2729.

Zhixin Shu at al., "EyeOpener: Editing Eyes in the Wild", ACM Transactions on Graphics, vol. 36, No. 1, Feb. 13, 2017, p. 1-13.

Supplementary European Search Report in the European application No. 18899051.9, dated Feb. 9, 2021.

Second Office Action of the Chinese application No. 201810024320.9, dated Apr. 7, 2021.

Huang Shanchun, etc., Image local blur measurement based on BP neural network, Journal of Image and Graphics, Issue 1, Jan. 16, 2015 (Jan. 16, 2015), p. 20-28.

First Office Action of the Chinese application No. 201810024320.9, dated Aug. 28, 2020.

Written Opinion of the International Search Authority in the International application No. PCT/CN2018/120108, dated Mar. 13, 2019.

Third Office Action of the Chinese application No. 201810024320.9, dated Aug. 26, 2021.

Office Action of the Indian application No. 202027030934, dated Sep. 2, 2021.

Decision of Refusal of the Chinese application No. 201810024320.9, dated Jan. 7, 2022.

* cited by examiner

IMAGE PROCESSING METHOD, APPARATUS, STORAGE MEDIUM, AND ELECTRONIC DEVICE

CROSS-REFERENCE TO RELATED APPLICATION

This is a continuation application of International Patent Application No. PCT/CN2018/120108, filed on Dec. 10, 2018, which claims priority to Chinese Patent Application No. 201810024320.9, filed to the Patent Office of the People's Republic of China on Jan. 10, 2018, entitled "Image Processing Method, Apparatus, Storage Medium and Electronic Device", the disclosures of which are hereby incorporated by reference in their entirety.

BACKGROUND

An existing electronic device usually has photographing and video recording functions. With rapid development of intelligent electronic devices and computer vision technologies, requirements of users on cameras of intelligent electronic devices have been extended to image processing functions more, not limited to conventional photographing and video recording. Technologies such as intelligent retouching and style transfer have been popularized by more and more intelligent electronic devices.

SUMMARY

The disclosure relates to the technical field of image processing, and particularly to a method and device for processing an image, a storage medium and an electronic device.

According to a first aspect of the embodiments of the disclosure, there is provided a method for processing an image, which may include the following operations.

A face area in a target image is identified.

A local area to be processed in the face area is determined based on a trained convolutional neural network model.

Posture information of a face in the target image is acquired.

A target sample face image is selected from a face image database according to the posture information.

The local area is corrected according to the target sample face image.

According to a second aspect of the embodiments of the disclosure, there is provided a device for processing an image, which may include an identification module, a determination module, a first acquisition module, a selection module and a correction module.

The identification module may be configured to identify a face area in a target image.

The determination module may be configured to determine a local area to be processed from the face area based on a trained convolutional neural network model.

The first acquisition module may be configured to acquire posture information of a face in the target image.

The selection module may be configured to select a target sample face image from a face image database according to the posture information.

The correction module may be configured to correct the local area according to the target sample face image.

According to a third aspect of the embodiments of the disclosure, there is also provided a storage medium, on which a plurality of instructions may be stored, the instructions being to be loaded by a processor to execute the following steps.

A face area in a target image is identified.

A local area to be processed in the face area is determined based on a trained convolutional neural network model.

Posture information of a face in the target image is acquired.

A target sample face image is selected from a face image database according to the posture information.

The local area is corrected according to the target sample face image.

According to a fourth aspect of the embodiments of the disclosure, there is also provided an electronic device, which may include a processor and a memory. The processor may be electrically connected with the memory, the memory may be configured to store instructions and data, and the processor may be configured to execute the following steps.

A face area in a target image is identified.

A local area to be processed in the face area is determined based on a trained convolutional neural network model.

Posture information of a face in the target image is acquired.

A target sample face image is selected from a face image database according to the posture information.

The local area is corrected according to the target sample face image.

BRIEF DESCRIPTION OF THE DRAWINGS

In order to describe the technical solutions in the embodiments of the disclosure more clearly, the drawings required to be used in descriptions about the embodiments will be simply introduced below. It is apparent that the drawings described below are only some embodiments of the disclosure. Other drawings may further be obtained by those skilled in the art according to these drawings without creative work.

DETAILED DESCRIPTION

The technical solutions in the embodiments of the disclosure will be clearly and completely described below in combination with the drawings in the embodiments of the disclosure. It is apparent that the described embodiments are not all embodiments but only part of embodiments of the disclosure. All other embodiments obtained by those skilled in the art based on the embodiments in the disclosure without creative work shall fall within the scope of protection of the disclosure.

The embodiments of the disclosure provide a method and device for processing an image, a storage medium and an electronic device. Detailed descriptions will be made below respectively.

Figure 1:
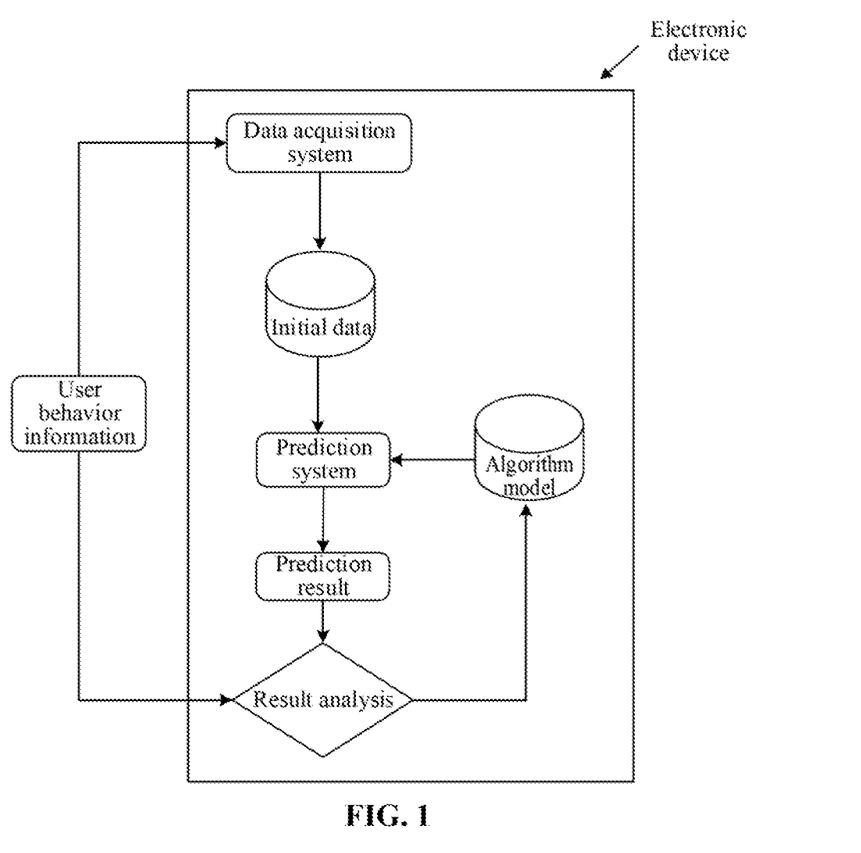
FIG. 1 is a schematic structure diagram of a scenario of implementing deep learning by an electronic device according to an embodiment of the disclosure.

Referring to FIG. 1, FIG. 1 is a schematic diagram of a scenario of implementing deep learning by an electronic device according to an embodiment of the disclosure.

When a user processes an image in the electronic device, the electronic device may record related information in a processing process. The electronic device may include a data acquisition and statistical system, and a prediction system with a feedback and regulation function. The electronic device may acquire a large amount of image classification result data of the user through the data acquisition system, make corresponding statistics, extract image features of the images, and perform analysis processing on the extracted image features based on machine deep learning. When an image is input, the electronic device predicts a classification result of the image through the prediction system. After a final selection behavior of the user, the prediction system reversely feeds back and regulates a weight value of each weight according to a final result of user behavior. After multiple iterative corrections, the weight value of each weight of the prediction system finally converges to form a database obtained by learning.

For example, a face dataset may be constructed at first, different annotations are made for images with blurry and unfocused faces, noises and ghost feature areas. Then training is performed based on these annotated images by use of a convolutional neural network. The iterative correction is performed for many times to enable the convolutional neural network to correctly determine images with problems of blur, unfocusing, noises, ghosts and the like, thereby obtaining a relatively good classification algorithm model.

The electronic device may be a mobile terminal such as a mobile phone and a tablet computer, or may be a conventional Personal Computer (PC) and the like. There are no limits made thereto in the embodiments of the disclosure.

Figure 2:
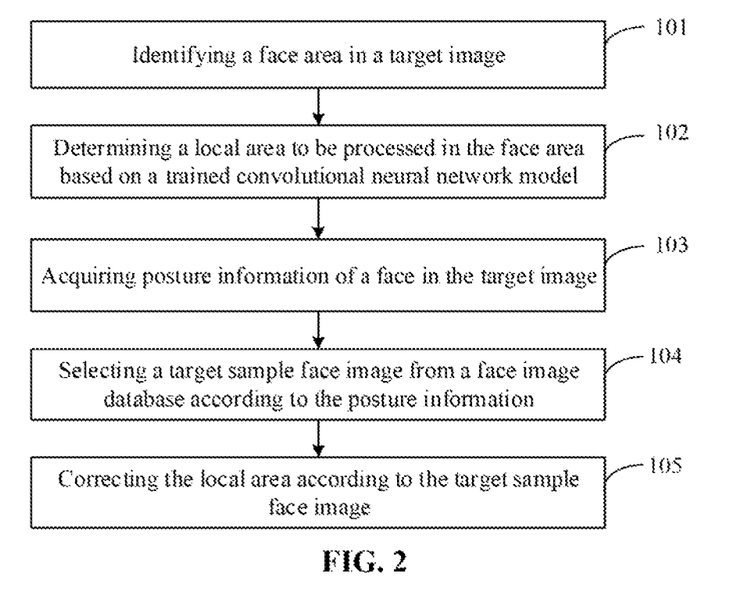
FIG. 2 is a schematic flowchart of a method for processing an image according to an embodiment of the disclosure.

In an embodiment, there is provided a method for processing an image. As illustrated in FIG. 2, a process may be as follows.

In 101, a face area in a target image is identified.

In some embodiments, the target image may specifically be an image acquired by an electronic device through a camera. The camera may be a digital camera or may be an analogue camera. The digital camera may convert an analogue image signal generated by an image acquisition device into a digital signal, and further store the digital signal in a computer. An image signal captured by the analogue camera may be transferred to the computer for use only after the analogue signal is convened into a digital mode through a specific image capturing card and is compressed. The digital camera may directly capture an image, then transmit the image to the computer through a serial or parallel interface or a Universal Serial Bus (USB) interface.

The method for processing an image provided in the embodiment of the disclosure is mainly for some images with problems of blur, unfocusing, noises, ghosts and the like. Particularly, when a self-portrait is taken by use of the camera of the electronic device, for example, a mobile phone, a front camera is relatively low in pixel and relatively low in shutter speed. It is likely to ghost the picture due to shake in photographing and bring serious noise influence during photographing in dark evenings. The target image includes one or more person images and includes at least one recognizable face. In addition, the target image may further include a scenery image such as a building, an animal and a plant.

In the embodiment of the disclosure, the face area in the target image may be identified based on an image identification technology. For example, the five sense organs of the face are identified.

In 102, a local area to be processed in the face area is determined based on a trained convolutional neural network model.

In the embodiment of the disclosure, it is necessary to acquire data and pre-train the convolutional neural network model. That is, before the operation that the face area in the target image is identified, the method may further include the following operations.

A convolutional neural network is constructed.

A plurality of marked sample images and marked areas of a face in the target image are acquired, a marked area being an area of which image quality does not reach a preset condition.

Training samples are generated according to the sample images and the marked areas.

Parameter training is performed on the constructed convolutional neural network based on the training samples to obtain the trained convolutional neural network model.

In some embodiments, the constructed convolutional neural network may be a multi-scale structure with branches. These branches execute operations on different sampling versions according to different sizes of input test images. Each such branch has a zero-padding convolution module, followed by linear correction. These branches are combined through nearest-neighbor upsamplings differing by twice and concatenation along the channel axis.

In a specific implementation process, firstly, historical self-portrait images shot by a user from various angles may be acquired to construct a face self-portrait dataset. The images with blurry and unfocused face self-portraits, noises and ghost feature areas are annotated, and specific areas with the problems of blur, unfocusing, noises, ghosts and the like in the images may further be marked. During a practical application, an image quality threshold may be set. Images are recorded not to reach a preset condition if the problems of blur, unfocusing, noises, ghosts and the like reach certain degrees, otherwise are recorded to reach the preset condition. Here, the preset condition may be thresholds of blurriness, an unfocusing degree, a noise degree and/or a ghost degree, and may be measured and calculated through a related image algorithm.

In a specific training process, the training samples are inputted at first, parameter initialization is executed. A fully connected layer is reached after convolution and sampling processes, the processed images are outputted. The iterative correction is performed for many times to enable the convolutional neural network to correctly determine images with the problems of blur, unfocusing, noises, ghosts and the like, thereby obtaining a relatively good convolutional neural network model.

In 103, posture information of a face in the target image is acquired.

Specifically, key point detection may be performed on the face in the target image to determine a posture of the face. That is, in some embodiments, the step that "the posture information of the face in the target image is acquired" may include the following process.

Facial feature points of the face in the target image are determined.

A facial feature vector is generated according to the facial feature points.

A difference value between the facial feature vector and a preset facial feature vector is acquired.

The posture information of the face is acquired according to the difference value.

The facial feature points may specifically be feature points obtained according to "two eyes+a mouth" or "two eyes+a nose" in a face image. The preset facial feature vector may be a feature vector when the face is a front face. The posture information may be a posture relative to the front face. For example, referring to FIG. 3, A is the eyebrow, B1 is the left eye, B2 is the right eye, C is the nose, D is the mouth, E is the ear and F is the cheek. The two eyes B1 and B2 and the nose C are taken as feature parts, and feature points are further selected from the feature parts as facial feature points. Vectors formed by position relationships between the feature points are feature vectors.

Figure 3:
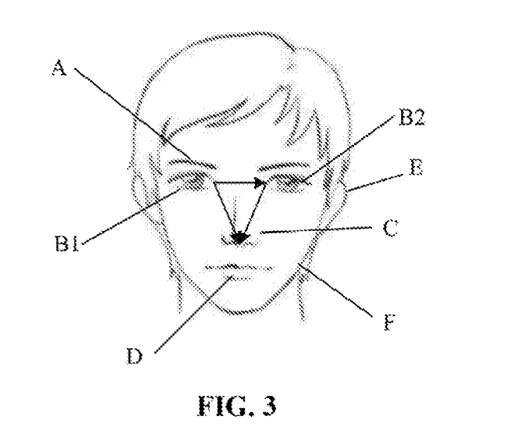
FIG. 3 is a diagram of an application scenario of a method for processing an image according to an embodiment of the disclosure.

Feature points, i.e., the inner corner of the eye B1, the inner corner of the eye B2 and the tip of the nose C (since the eyeball may move, an identification point at a fixed position may be selected), selected in FIG. 3 are taken as facial feature points, and three vectors forming a triangular area are generated. In FIG. 3, the three vectors may be taken as preset facial feature vectors. During the practical application, once the posture of the face changes, magnitudes and/or directions of the three vectors may also change. Therefore, a real-time facial feature vector of the face may be detected and compared with the preset facial feature vector, such that posture information of the present face image is determined according to a calculated difference value therebetween. For example, the face is deflected to the left, deflected to the right, deflected to the upper part, deflected to the lower part, deflected to the right upper part or deflected to the left lower part.

In 104, a target sample face image is selected from a face image database according to the posture information.

In the embodiment of the disclosure, it is necessary to construct the face image database in advance. It should be noted that referring to FIG. 4, the face image database includes a plurality of sample face images of the same person in different postures. Since the embodiment of the disclosure is mainly for the problems of blur, unfocusing, noises, ghosts and the like of images, all sample face images in the constructed face image database are images with relatively high image quality. During the practical application, these high-definition sample face images may be shot by the user in a good light scenario.

Figure 4:
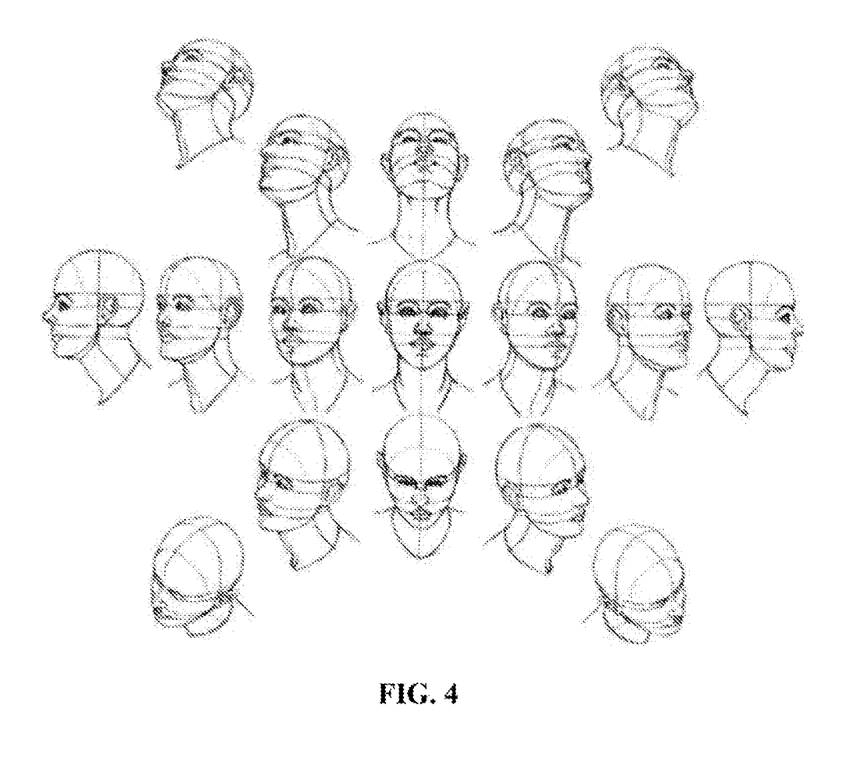
FIG. 4 is a diagram of another application scenario of a method for processing an image according to an embodiment of the disclosure.

When the preset face image database is constructed, firstly, a plurality of pictures in different postures are acquired. Specifically, pictures may be acquired from different angles. Then, a deflection angle of the face relative to a plane where a lens of a camera is located is obtained through a shooting parameter of the camera or a position relationship between the lens and the photographed. Finally, acquired face images are taken as the sample face images, deflection angles corresponding to the sample face images are taken as sample deflection angles. After a mapping relationship between the shot face images and the deflection angles is established, the sample face images, the sample deflection angles and the mapping relationship therebetween are added into the preset face image database to complete construction of a set.

Correspondingly, in some embodiments, the posture information may include a deflection angle. In such case, the step that "the target sample face image is selected from the face image database according to the posture information" may include the following process.

A sample deflection angle corresponding to each sample face image in the face image database is acquired to obtain a plurality of sample deflection angles.

A target sample deflection angle having a minimum difference with the deflection angle is selected from the plurality of sample deflection angles.

The sample face image corresponding to the target sample deflection angle is determined as the target sample face image.

The deflection angle may be a deflection angle in six degrees of freedom. For improving a matching degree of the face area and the sample face image, a large number of face images in different postures may be acquired to increase a density of the deflection angles in the sample face images and reduce an interval value between the deflection angles.

In 105, the local area is corrected according to the target sample face image.

In the embodiment of the disclosure, the target sample face image is a high-definition image. Thus the local area with relatively poor image quality in the target image may be corrected based on the target sample face image to improve the image quality of the target image.

In some embodiments, the local image may be corrected and regulated according to a part, corresponding to the local area, in the target sample face image to reduce influence of the problems of blur, unfocusing, noises, ghosts and the like on the local image. That is, in some embodiments, the step that "the local area is corrected according to the target sample face image" may include the following process.

Affine transformation is performed on the target sample face image based on the face area to align the face area with a transformed target sample face image.

The local area is mapped to the transformed target sample face image to determine a mapped area in the target sample face image.

An image feature is extracted from the mapped area, and the local area is corrected according to the image feature.

Specifically, a size of the target sample face image may be the same as a size of the face area in the target image, and angles of the two images may also be different. Therefore, for matching each part of the face better, affine transformation processing is needed to be performed to align the face area in the target image with the target sample face image. After the two images are aligned, the local area needs to be processed in the face area is mapped to the transformed target sample face image, thereby determining the mapped area, corresponding to the local area, in the target sample face image, to correct the local area based on the mapped area.

In some embodiments, the step that "the image feature is extracted from the mapped area, and the local area is corrected according to the image feature" may include the following process.

The image feature is extracted from the mapped area.

Analysis processing is performed on the image feature based on a preset algorithm model to acquire image feature parameters.

The local area is corrected according to the image feature parameters.

In some embodiments, the image feature may specifically be a color feature, texture feature, shape feature and spatial relationship feature extracted from the face image. For improving identification accuracy, the electronic device may be trained based on a machine deep learning technology to obtain a high-accuracy algorithm model, and analysis processing is performed on the image feature, thereby obtaining accurate image feature parameters.

Then, the local area in the target image may be regulated according to the obtained image feature parameters. The color, texture, shape and spatial position features and the like of the target sample face image are regulated to be consistent with image features in the mapped area, to implement correction of the local area.

In a specific implementation process, the color feature of the image may be represented and extracted by use of a color histogram, a color moment, a color set, a color coherence vector, a color correlogram and the like. The texture feature of the image may be extracted by use of a statistical method, a geometric method, a model method and a signal processing method. In addition, the shape feature of the image may be extracted by use of a boundary feature method, a Fourier shape description method, a collection parameter method and a shape invariant moment method. Moreover, for the spatial relationship feature of the image, the feature may be extracted through a model-based pose estimation method and a learning-based pose estimation method.

After the local area is corrected, color information of an original face area in the target image may further be acquired, and a color regulation parameter is generated according to the color information. The acquired color information may include various types, such as a color temperature, a hue, brightness and saturation. Then, a color of the corrected local area in the present face area is finely regulated according to the color regulation parameter to ensure even skin tone and more natural face brightness and color of the whole face area.

In some embodiments, after the operation that the local area is corrected according to the target sample face image, the method may further include the following operations.

Whether a deletion instruction of a user for the corrected target image is received in a preset time period is determined.

When the deletion instruction of the user for the corrected target image is not received in the preset time period, the face image database is updated according to the corrected target image.

It can be understood that the user, if approving the corrected image, may keep the corrected image in an album of the electronic device and, if not satisfied with the corrected image, may usually delete the corrected image from the album. The corrected image may be added into the face image database to update facial features to make a display effect of the picture more consistent with a shooting habit of the user. The preset time period may be set by those skilled in the art or a manufacturer of the product to be, for example, a week or a month.

It can be seen from the above that, according to the embodiment of the disclosure, there is provided a method for processing an image. The face area in the target image is identified. The local area to be processed in the face area is determined based on the trained convolutional neural network model. The posture information of the face in the target image is acquired, the target sample face image is selected from the face image database according to the posture information. The local area is corrected according to the target sample face image. According to the solution, an image with relatively poor image quality may be corrected to improve the quality of the image.

Figure 5:
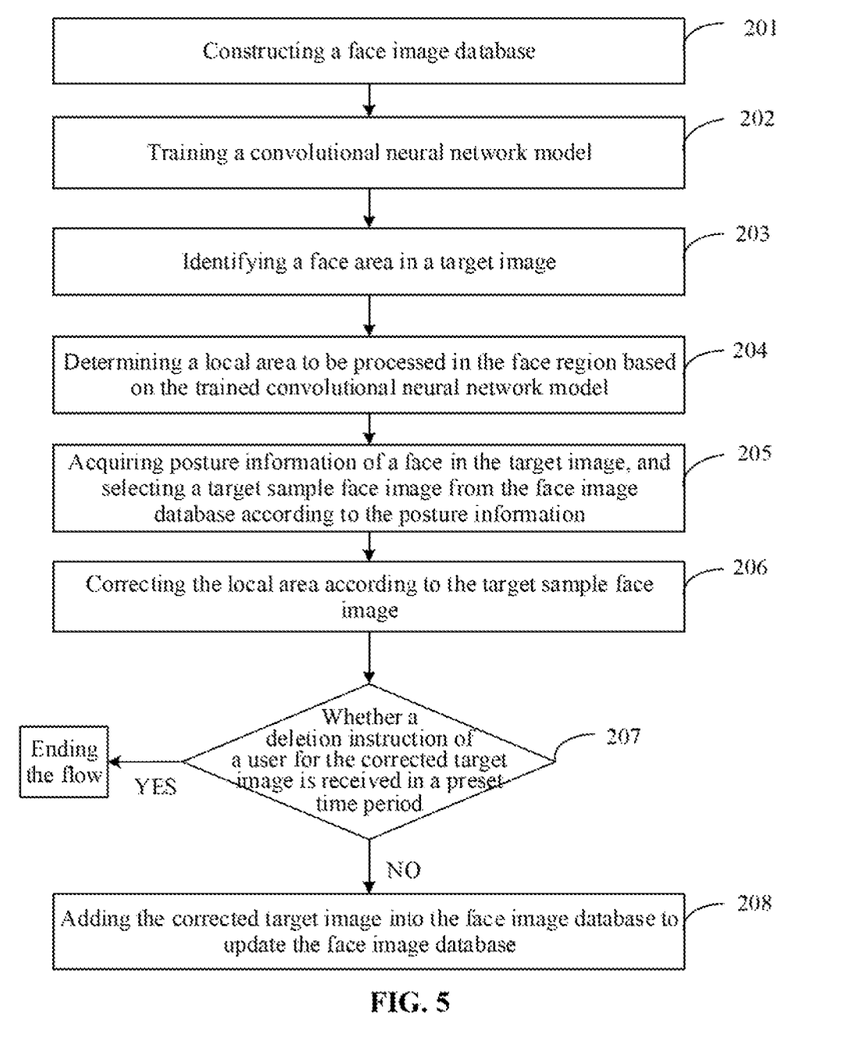
FIG. 5 is another schematic flowchart of a device for processing an image according to an embodiment of the disclosure.

In an embodiment, there is also provided another method for processing an image. As illustrated in FIG. 5, a process may be as follows.

In 201, a face image database is constructed.

In the embodiment of the disclosure, it is necessary to construct the face image database in advance. It should be noted that the face image database includes a plurality of sample face images of the same person in different postures. Since the embodiment of the disclosure is mainly for problems of blur, unfocusing, noises, ghosts and the like of images, all sample face images in the constructed face image database are images with relatively high image quality. During a practical application, these high-definition sample face images may be shot by a user in a good light scenario.

When the preset face image database is constructed, a plurality of pictures in different postures are acquired at first. Specifically, pictures may be acquired from different angles. Then, a deflection angle of a face relative to a plane where a lens of a camera is located is obtained through a shooting parameter of the camera or a position relationship between the lens and the photographed. Finally, acquired face images are taken as the sample face images, deflection angles corresponding to the sample face images are taken as sample deflection angles. After a mapping relationship between the shot face images and the deflection angles is established, the sample face images, the sample deflection angles and the mapping relationship therebetween are added into the preset face image database to complete construction of a set.

In 202, a convolutional neural network model is trained.

In the embodiment of the disclosure, it is necessary to acquire data and pre-train the convolutional neural network model. That is, before the operation that a face area in a target image is identified, the method may further include the following operations.

A convolutional neural network is constructed.

A plurality of marked sample images and marked areas of a face in the target image are acquired, a marked area being an area of which image quality does not reach a preset condition.

Training samples are generated according to the sample images and the marked areas.

Parameter training is performed on the constructed convolutional neural network based on the training samples to obtain the trained convolutional neural network model.

In a specific implementation process, firstly, historical self-portrait images shot by the user from various angles may be acquired to construct a face self-portrait dataset. The images with blurry and unfocused face self-portraits, noises and ghost feature areas are annotated, and specific areas with the problems of blur, unfocusing, noises, ghosts and the like in the images may further be marked. During the practical application, an image quality threshold may be set. Images are recorded not to reach a preset condition if the problems of blur, unfocusing, noises, ghosts and the like reach certain degrees, otherwise are recorded to reach the preset condition. Here, the preset condition may be thresholds of blurriness, an unfocusing degree, a noise degree and/or a ghost degree, and may be measured and calculated through a related image algorithm.

In a specific training process, the training samples are inputted at first, parameter initialivation is executed. A fully connected layer is reached after convolution and sampling processes, the processed images are outputted. The iterative correction is performed for many times to enable the convolutional neural network to correctly determine images with the problems of blur, unfocusing, noises, ghosts and the like, thereby obtaining a relatively good convolutional neural network model.

In 203, a face area in a target image is identified.

In some embodiments, the target image may specifically be an image acquired by an electronic device through the camera. The method for processing an image provided in the embodiment of the disclosure is mainly for some images with the problems of blur, unfocusing, noises, ghosts and the like. The target image includes one or more person images and includes at least one recognizable face. In addition, the target image may further include a scenery image such as a building, an animal and a plant.

In the embodiment of the disclosure, the face area in the target image may be identified based on an image identification technology. For example, the five sense organs of the face are identified.

In 204, a local area to be processed in the face area is determined based on the trained convolutional neural network model.

Specifically, a blurry, unfocused, noisy or ghosted area in the target image may be distinguished based on the trained convolutional neural network model as the local area to be processed.

In 205, posture information of a face in the target image is acquired, and a target sample face image is selected from the face image database according to the posture information.

Specifically, key point detection may be performed on the face in the target image to determine a posture of the face. That is, in some embodiments, the step that "the posture information of the face in the target image is acquired" may include the following process.

Facial feature points of the face in the target image are determined.

A facial feature vector is generated according to the facial feature points.

A difference value between the facial feature vector and a preset facial feature vector is acquired.

The posture information of the face is acquired according to the difference value.

The facial feature points may specifically be feature points obtained according to "two eyes+a mouth" or "two eyes+a nose" in a face image. The preset facial feature vector may be a feature vector when the face is a front face. The posture information may be a posture relative to the front face. Vectors formed by position relationships between the feature points are feature vectors.

In some embodiments, the posture information may include a deflection angle. When the target sample face image is selected from the face image database, a sample deflection angle corresponding to each sample face image in the face image database may be acquired to obtain a plurality of sample deflection angles. Then a target sample deflection angle having a minimum difference with the deflection angle is selected from the plurality of sample deflection angles. The sample face image corresponding to the target sample deflection angle is determined as the target sample face image.

The deflection angle may be a deflection angle in six degrees of freedom. For improving a matching degree of the face area and the sample face image, a large number of face images in different postures may be acquired to increase a density of the deflection angles in the sample face images and reduce an interval value between the deflection angles.

In 206, the local area is corrected according to the target sample face image.

In the embodiment of the disclosure, the target sample face image is a high-definition image, and thus the local area with relatively poor image quality in the target image may be corrected based on the target sample face image to improve the image quality of the target image.

In some embodiments, the local image may be corrected and regulated according to a part, corresponding to the local area, in the target sample face image to reduce influence of the problems of blur, unfocusing, noises, ghosts and the like on the local image. For example, affine transformation may be performed on the target sample face image based on the face area to align the face area with a transformed target sample face image. Then the local area is mapped to the transformed target sample face image to determine a mapped area in the target sample face image. Finally, an image feature is extracted from the mapped area, and the local area is corrected according to the image feature.

Specifically, a size of the target sample face image may be the same as a size of the face area in the target image, and angles of the two images may also be different. Therefore, for matching each part of the face better, affine transformation processing is needed to be performed to align the face area in the target image with the target sample face image. After the two images are aligned, the local area needs to be processed in the face area is mapped to the transformed target sample face image, thereby determining the mapped area, corresponding to the local area, in the target sample face image, to correct the local area based on the mapped area.

In some embodiments, when a specific correction operation is executed, analysis processing may be performed on the image feature based on a related algorithm model to acquire image feature parameters. Then, the local area in the target image may be regulated according to the obtained image feature parameters. Color, texture, shape and spatial position features and the like of the target sample face image are regulated to be consistent with image features in the mapped area to implement correction of the local area. The image feature may specifically be the color feature, texture feature, shape feature and spatial relationship feature extracted from the face image.

After the local area is corrected, color information of an original face area in the target image may further be acquired, and a color regulation parameter is generated according to the color information. The acquired color information may include various types, such as a color temperature, a hue, brightness and saturation. Then, a color of the corrected local area in the present face area is finely regulated according to the color regulation parameter to ensure even skin tone and more natural face brightness and color of the whole face area.

In 207, whether a deletion instruction of a user for the corrected target image is received in a preset time period is determined. If when the deletion instruction of the user for the corrected target image is received in the preset time period, the process is ended, otherwise 208 is executed.

Specifically, after the local area is corrected, whether the deletion instruction of the user for the corrected target image is received in the preset time period is determined. It can be understood that the user, if approving the corrected image, may keep the corrected image in an album of the electronic device and, if not satisfied with the corrected image, may usually delete the corrected image from the album.

The preset time period may be set by those skilled in the art or a manufacturer of the product to be, for example, a week or a month.

In 208, the corrected target image is added into the face image database to update the face image database.

Specifically, if the deletion instruction of the user for the corrected target image is not received in the preset time period, it is indicated that the user accepts the corrected image. In such case, the corrected image may be added into the face image database to update the face image database, which makes a display effect of the picture more consistent with a shooting habit of the user.

It can be seen from the above that, according to the embodiment of the disclosure, there is provided a method for processing an image. The face area in the target image is identified. The local area to be processed in the face area is determined based on the trained convolutional neural network model. The posture information of the face in the target image is acquired. The target sample face image is selected from the face image database according to the posture information. The local area is corrected according to the target sample face image. When the deletion instruction of the user for the corrected target image is not received in the preset time period, the corrected target image is added into the face image database to update the face image database. According to the solution, an image with relatively poor image quality may be corrected to improve the quality of the image. In addition, the face image database may be updated based on the corrected image, such that the display effect of the picture is more consistent with the shooting habit of the user.

Figure 6:
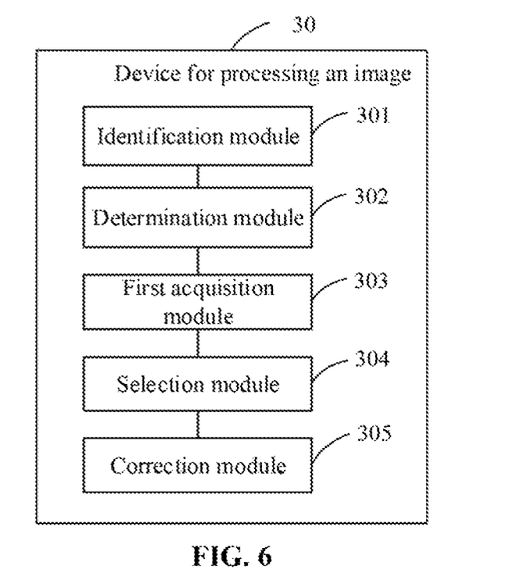
FIG. 6 is a schematic structure diagram of a device for processing an image according to an embodiment of the disclosure.

In another embodiment of the disclosure, there is also provided a device for processing an image. The device for processing an image may be integrated into an electronic device in form of software or hardware, and the electronic device may specifically include a device such as a mobile phone, a tablet computer and a notebook computer. As illustrated in FIG. 6, the device for processing an image 30 may include an identification module 301, a determination module 302, a first acquisition module 303, a selection module 304 and a correction module 305.

The identification module 301 is configured to identify a face area in a target image.

The determination module 302 is configured to determine a local area to be processed in the face area based on a trained convolutional neural network model.

The first acquisition module 303 is configured to acquire posture information of a face in the target image.

The selection module 304 is configured to select a target sample face image from a face image database according to the posture information.

The correction module 305 is configured to correct the local area according to the target sample face image.

Figure 7:
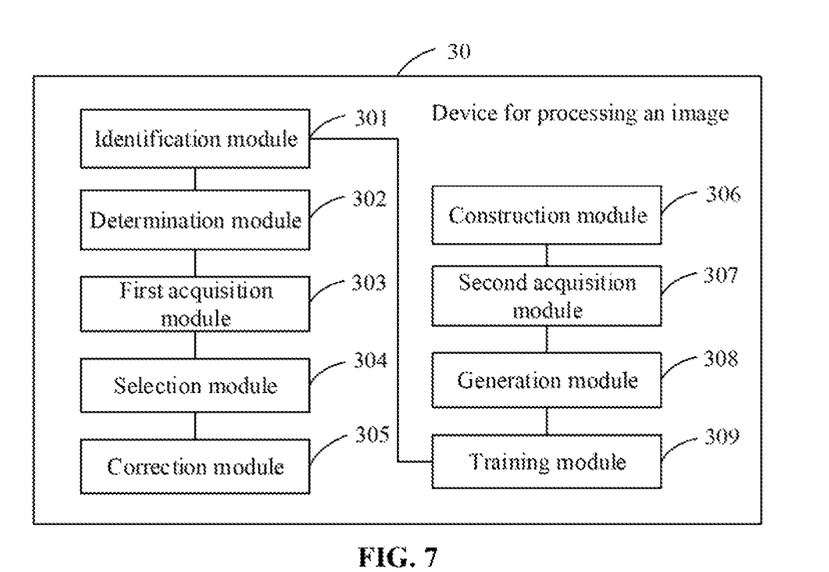
FIG. 7 is another schematic structure diagram of a device for processing an image according to an embodiment of the disclosure.

In some embodiments, referring to FIG. 7, the device for processing an image 30 may further include a construction module 306, a second acquisition module 307, a generation module 308 and a training module 309.

The construction module 306 is configured to, before the face area in the target image is identified, construct a convolutional neural network.

The second acquisition module 307 is configured to acquire a plurality of marked sample images and marked areas of the face in the target image, the marked area being an area of which image quality does not reach a preset condition.

The generation module 308 is configured to generate training samples according to the sample images and the marked areas.

The training module 309 is configured to perform parameter training on the constructed convolutional neural network based on the training samples to obtain the trained convolutional neural network model.

In some embodiments, the first acquisition module 303 may be configured to determine facial feature points of the face in the target image, generate a facial feature vector according to the facial feature points, acquire a difference value between the facial feature vector and a preset facial feature vector, and acquire the posture information of the face according to the difference value.

Figure 8:
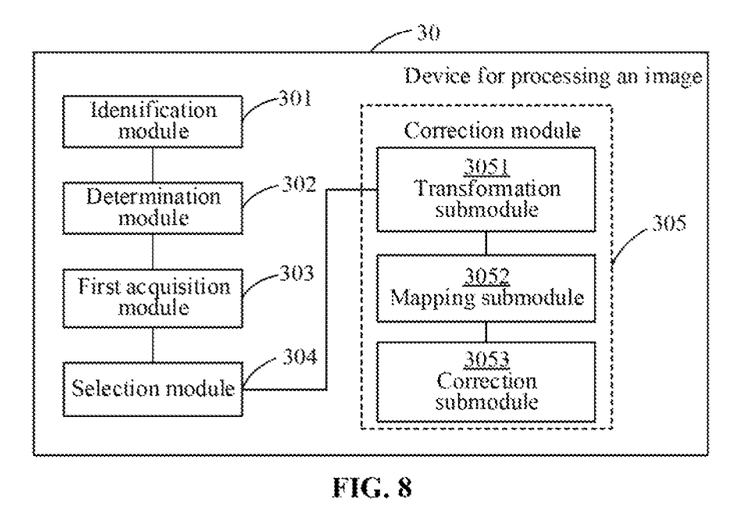
FIG. 8 is yet another schematic structure diagram of a device for processing an image according to an embodiment of the disclosure.

In some embodiments, referring to FIG. 8, the correction module 305 may include a transformation submodule 3051, a mapping submodule 3052 and a correction submodule 3053.

The transformation submodule 3051 is configured to perform affine transformation on the target sample face image based on the face area to align the face area with a transformed target sample face image.

The mapping submodule 3052 is configured to map the local area to the transformed target sample face image to determine a mapped area in the target sample face image.

The correction submodule 3053 is configured to extract an image feature from the mapped area and correct the local area according to the image feature.

Figure 9:
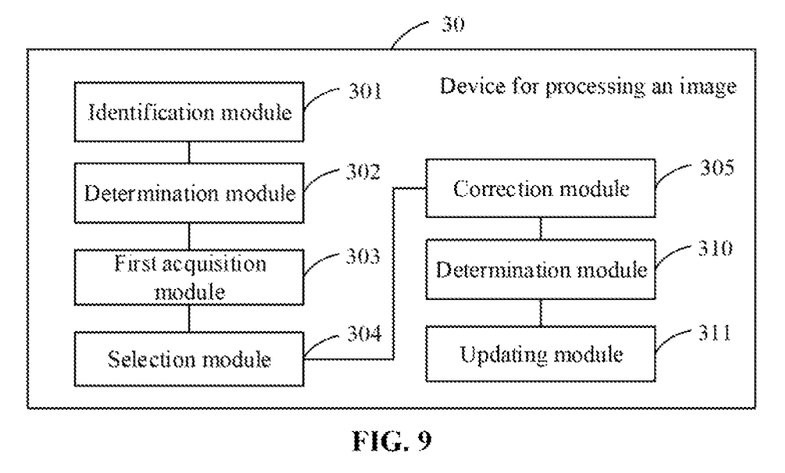
FIG. 9 is a further schematic structure diagram of a device for processing an image according to an embodiment of the disclosure.

In some embodiments, referring to FIG. 9, the device for processing an image 30 may further include a determination module 310 and an updating module 311.

The judgment module 310 is configured to determine, after the local area is corrected according to the target sample face image, whether a deletion instruction of a user for the corrected target image is received in a preset time period.

The updating module 311 is configured to update, when the deletion instruction of the user for the corrected target image is not received in the preset time period, the face image database according to the corrected target image.

It can be seen from the above that, according to the embodiment of the disclosure, there is provided a method for processing an image. The face area in the target image is identified. The local area to be processed in the face area is determined based on the trained convolutional neural network model. The posture information of the face in the target image is acquired. The target sample face image is selected from the face image database according to the posture information. The local area is corrected according to the target sample face image. According to the solution, an image with relatively poor image quality may be corrected to improve the quality of the image.

Figure 10:
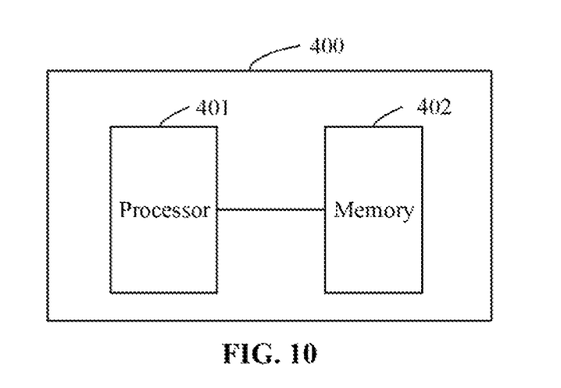
FIG. 10 is a schematic structure diagram of an electronic device according to an embodiment of the disclosure.

In another embodiment of the disclosure, there is also provided an electronic device. The electronic device may be a device such as a smart phone and a tablet computer. As illustrated in FIG. 10, the electronic device 400 includes a processor 401 and a memory 402. The processor 401 is electrically connected with the memory 402.

The processor 401 is a control center of the electronic device 400, connects each part of the electronic device by use of various interfaces and lines. And the processor 401 executes various functions of the electronic device and data processing by running or loading an application program stored in the memory 402 and calling data stored in the memory 402, thereby monitoring the whole electronic device.

In the embodiment, the processor 401 in the electronic device 400 may load instructions corresponding to a process of one or more than one application program into the memory 402 according to the following steps. The processor 401 runs the application program stored in the memory 402, thereby realizing various functions.

A face area in a target image is identified.

A local area to be processed in the face area is determined based on a trained convolutional neural network model.

Posture information of a face in the target image is acquired.

A target sample face image is selected from a face image database according to the posture information.

The local area is corrected according to the target sample face image.

In some embodiments, before the face area is identified in the target image, the processor 401 may execute the following steps.

A convolutional neural network is constructed.

A plurality of marked sample images and marked areas of the face in the target image are acquired, the marked area being an area of which image quality does not reach a preset condition.

Training samples are generated according to sample images and the marked areas.

Parameter training is performed on the constructed convolutional neural network based on the training samples to obtain the trained convolutional neural network model.

In some embodiments, the processor 401 may execute the following steps.

Facial feature points of the face in the target image is determined.

A facial feature vector is generated according to the facial feature points.

A difference value between the facial feature vector and a preset facial feature vector is acquired.

The posture information of the face is acquired according to the difference value.

In some embodiments, the posture information includes a deflection angle, and the processor 401 may execute the following steps.

A sample deflection angle corresponding to each sample face image in the face image database is acquired to obtain a plurality of sample deflection angles.

A target sample deflection angle having a minimum difference with the deflection angle is selected from the plurality of sample deflection angles.

The sample face image corresponding to the target sample deflection angle is determined as the target sample face image.

In some embodiments, the processor 401 may execute the following steps.

Affine transformation is performed on the target sample face image based on the face area to align the face area with a transformed target sample face image.

The local area is mapped to the transformed target sample face image to determine a mapped area in the target sample face image.

An image feature is extracted from the mapped area, and the local area is corrected according to the image feature.

In some embodiments, after the local area is corrected according to the target sample face image, the processor 401 may execute the following steps.

Whether a deletion instruction of a user for the corrected target image is received in a preset time period is determined.

When the deletion instruction of the user for the corrected target image is not received in the preset time period, the face image database is updated according to the corrected target image.

The memory 402 may be configured to store an application program and data. The application program stored in the memory 402 includes the instructions executable for the processor. The application program may form various functional modules. The processor 401 runs the application program stored in the memory 402, thereby executing various functional applications and data processing.

Figure 11:
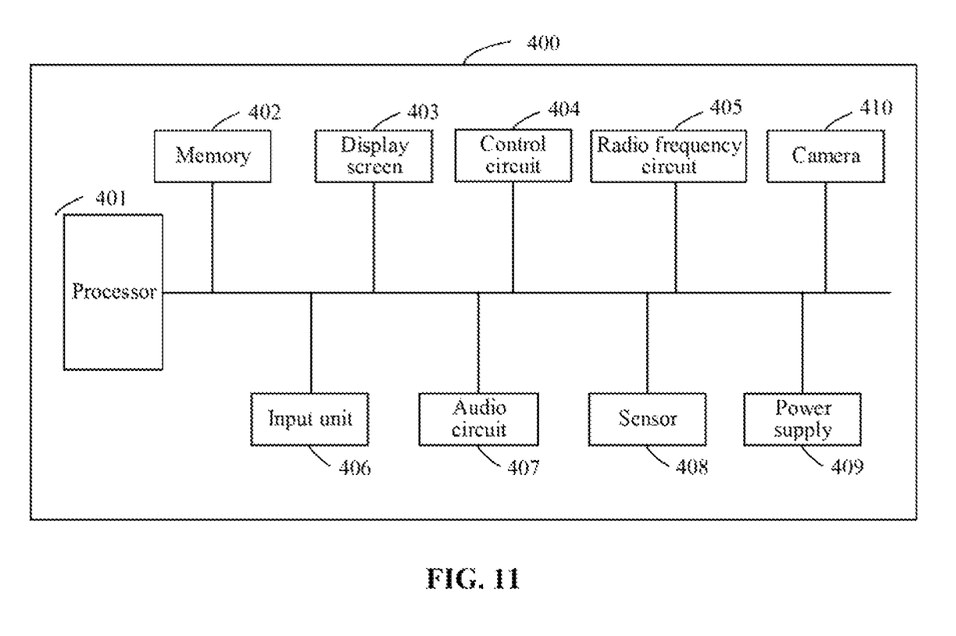
FIG. 11 is another schematic structure diagram of an electronic device according to an embodiment of the disclosure.

In some embodiments, as illustrated in FIG. 11, the electronic device 400 further includes a display screen 403, a control circuit 404, a radio frequency circuit 405, an input unit 406, an audio circuit 407, a sensor 408 and a power supply 409. The processor 401 is electrically connected with the display screen 403, the control circuit 404, the radio frequency circuit 405, the input unit 406, the audio circuit 407, the sensor 408 and the power supply 409 respectively.

The display screen 403 may be configured to display information input by the user or information provided for the user and various graphical user interfaces of the electronic device 400. These graphical user interfaces may be formed by images, texts, icons, videos and any combination thereof. The display screen 403 may be configured to display the information as a screen in the embodiment of the disclosure.

The control circuit 404 is electrically connected with the display screen 403 and configured to control the display screen 403 to display the information.

The radio frequency circuit 405 is configured to transmit and receive radio frequency signals, to establish wireless communication with a network device or another electronic device through wireless communication and implement signal transmission and reception with the network device or other electronic devices.

The input unit 406 may be configured to receive input digital and character information or user characteristic information (for example, a fingerprint) and generate keyboard, mouse, joystick and optical trackball signal input related to user setting and function control. The input unit 406 may include a fingerprint identification module.

The audio circuit 407 may provide an audio interface between the user and the electronic device 400 through a loudspeaker and a microphone.

The sensor 408 is configured to acquire external environment information. The sensor 408 may include an ambient brightness sensor, an acceleration sensor, a light sensor, a motion sensor and other sensors.

The power supply 409 is configured to supply power to each component of the electronic device 400. In some embodiments, the power supply 409 may be logically connected with the processor 401 through a power management system, thereby realizing functions of charging and discharging management, power consumption management and the like through the power management system.

A camera 410 is configured to acquire an external image, may be a digital camera or may be an analogue camera. In some embodiments, the camera 410 may convert the acquired external image into data and send the data to the processor 401 to execute an image processing operation.

Although not illustrated in FIG. 11, the electronic device 400 may further include a Bluetooth module and the like, which will not be elaborated herein.

It can be seen from the above that, according to the electronic device provided in the embodiment of the disclosure, the face area in the target image is identified; the local area to be processed in the face area is determined based on the trained convolutional neural network model; the posture information of the face in the target image is acquired; the target sample face image is selected from the face image database according to the posture information; and the local area is corrected according to the target sample face image. According to the solution, an image with relatively poor image quality may be corrected to improve the quality of the image.

In another embodiment of the disclosure, a storage medium is also provided. A plurality pieces of instructions are stored in the storage medium. The instructions are suitable for a processor to load to execute the steps of any above mentioned method for processing an image. For example, a face area in a target image is identified; a local area to be processed in the face area is determined based on a trained convolutional neural network model; posture information of a face in the target image is acquired; a target sample face image is selected from a face image database according to the posture information; and the local area is corrected according to the target sample face image.

Those of ordinary skill in the art can understand that all or part of the steps in various methods of the embodiments may be completed by instructing related hardware through a program. The program may be stored in a computer-readable memory. The memory may include a Read Only Memory (ROM), a Random Access Memory (RAM), a magnetic disk, an optical disk or the like.

In the process of describing the concept of the disclosure, terms "a/an" and "said" and similar words are used (particularly in the appended claims), and these terms should be explained to be both singular and plural. In addition, unless otherwise stated, when numerical value ranges are described herein, each independent value of the related range is only indicated through a quick method, and each independent value is incorporated into the specification just like these values are independently described herein. In addition, unless otherwise specified or definitely opposite prompts given throughout the specification, the steps of all the methods in the disclosure may be executed in any proper sequence. Changes of the disclosure are not limited to the sequences of the described steps. Unless otherwise claimed, any and all instances or exemplary expressions (for example, "for example") provided in the disclosure are intended not to limit the scope of the concept of the disclosure but only to describe the concept of the disclosure better. It will be easy for those skilled in the art to understand various modifications and adaptations without departing from the spirit and the scope.

The image processing method and device, storage medium and electronic device provided in the embodiments of the disclosure are introduced above in detail, the principle and implementation modes of the disclosure are elaborated with specific examples herein, and the descriptions made to the embodiments are only adopted to help the method of the disclosure and the core concept thereof to be understood. In addition, those skilled in the art may make variations to the specific implementation modes and the application scope according to the concept of the disclosure. From the above, the contents of the specification should not be understood as limits to the disclosure.

The invention claimed is:

1. A method for processing an image, comprising:

identifying a face area in a target image;

determining a blurry, unfocused, noisy or ghosted area in the face area as a local area to be processed based on a trained convolutional neural network model;

acquiring posture information of a face in the face area;

selecting a target sample face image from a face image database according to the posture information; and regulating an image feature in the local area to be processed to be consistent with an image feature in a corresponding area of the target sample face image.

2. The method of claim 1, before identifying the face area in the target image, further comprising:

constructing a convolutional neural network;

acquiring a plurality of marked sample images and marked areas of the face in the target image, a marked area being an area of which image quality does not reach a preset condition;

generating training samples according to sample images and the marked areas; and performing parameter training on the constructed convolutional neural network based on the training samples, to obtain the trained convolutional neural network model.

3. The method of claim 1, wherein the step of acquiring the posture information of the face in the face area comprises:

determining facial feature points of the face in the face area;

generating a facial feature vector according to the facial feature points;

acquiring a difference value between the facial feature vector and a preset facial feature vector; and acquiring the posture information of the face according to the difference value.

4. The method of claim 1, wherein the posture information comprises a deflection angle, and selecting the target sample face image from the face image database according to the posture information comprises:

acquiring a sample deflection angle corresponding to each sample face image in the face image database, to obtain a plurality of sample deflection angles;

selecting from the plurality of sample deflection angles a target sample deflection angle having a minimum difference with the deflection angle; and determining a sample face image corresponding to the target sample deflection angle as the target sample face image.

5. The method of claim 1, wherein regulating the image feature in the local area to be processed to be consistent with the image feature in the corresponding area of the target sample face image comprises:

performing affine transformation on the target sample face image based on the face area to align the face area with a transformed target sample face image;

mapping the local area to the transformed target sample face image to determine a mapped area in the target sample face image; and extracting an image feature from the mapped area, and correcting the local area according to the image feature.

6. The method of claim 5, wherein extracting the image feature from the mapped area and correcting the local area according to the image feature comprises:
  extracting the image feature from the mapped area;
  performing analysis processing on the image feature based on a preset algorithm model to acquire image feature parameters; and
  correcting the local area according to the image feature parameters.

7. The method of claim 1, after regulating the image feature in the local area to be processed to be consistent with the image feature in the corresponding area of the target sample face image, further comprising:
  determining whether a deletion instruction of a user for the corrected target image is received in a preset time period; and
  updating, when the deletion instruction of the user for the corrected target image is not received in the preset time period, the face image database according to the corrected target image.

8. A non-transitory storage medium, on which a plurality of instructions are stored, the instructions being to be loaded by a processor to execute operations of:
  identifying a face area in a target image;
  determining a blurry, unfocused, noisy or ghosted area in the feature area as a local area to be processed based on a trained convolutional neural network model;
  acquiring posture information of a face in the face area;
  selecting a target sample face image from a face image database according to the posture information; and
  regulating an image feature in the local area to be processed to be consistent with an image feature in a corresponding area of the target sample face image.

9. The non-transitory storage medium of claim 8, before identifying the face area in the target image, the instructions being to be loaded by a processor to further execute operations of:
  constructing a convolutional neural network;
  acquiring a plurality of marked sample images and marked areas of the face in the target image, a marked area being an area of which image quality does not reach a preset condition;
  generating training samples according to sample images and the marked areas; and
  performing parameter training on the constructed convolutional neural network based on the training samples to obtain the trained convolutional neural network model.

10. The non-transitory storage medium of claim 8, wherein when acquiring the posture information of the face in the face area, the instructions being to be loaded by a processor to execute operations of:
  determining facial feature points of the face in the face area;
  generating a facial feature vector according to the facial feature points;
  acquiring a difference value between the facial feature vector and a preset facial feature vector; and
  acquiring the posture information of the face according to the difference value.

11. The non-transitory storage medium of claim 8, wherein the posture information comprises a deflection angle, and when selecting the target sample face image from the face image database according to the posture information, the instructions being to be loaded by a processor to execute operations of:
  acquiring a sample deflection angle corresponding to each sample face image in the face image database to obtain a plurality of sample deflection angles;
  selecting from the plurality of sample deflection angles a target sample deflection angle having a minimum difference with the deflection angle; and
  determining a sample face image corresponding to the target sample deflection angle as the target sample face image.

12. The non-transitory storage medium of claim 8, wherein when correcting the local area according to the target sample face image, the instructions being to be loaded by a processor to execute operations of:
  performing affine transformation on the target sample face image based on the face area to align the face area with a transformed target sample face image;
  mapping the local area to the transformed target sample face image to determine a mapped area in the target sample face image; and
  extracting an image feature from the mapped area, and correcting the local area according to the image feature.

13. The non-transitory storage medium of claim 12, wherein when extracting the image feature from the mapped area and correcting the local area according to the image feature, the instructions being to be loaded by a processor to execute operations of:
  extracting the image feature from the mapped area;
  performing analysis processing on the image feature based on a preset algorithm model to acquire image feature parameters; and
  correcting the local area according to the image feature parameters.

14. An electronic device, comprising a processor and a memory, wherein the processor is electrically connected with the memory, the memory is configured to store instructions and data, and the processor is configured to execute operations of:
  identifying a face area in a target image;
  determining a blurry, unfocused, noisy or ghosted area in the face area as a local area to be processed based on a trained convolutional neural network model;
  acquiring posture information of a face in the face area;
  selecting a target sample face image from a face image database according to the posture information; and
  regulating an image feature in the local area to be processed to be consistent with an image feature in a corresponding area of the target sample face image.

15. The electronic device of claim 14, before identifying the face area in the target image, the processor is further configured to execute operations of:
  constructing a convolutional neural network;
  acquiring a plurality of marked sample images and marked areas of the face in the target image, a marked area being an area of which image quality does not reach a preset condition;
  generating training samples according to sample images and the marked areas; and
  performing parameter training on the constructed convolutional neural network based on the training samples to obtain the trained convolutional neural network model.

16. The electronic device of claim 14, wherein when acquiring the posture information of the face in the face area, the processor is configured to execute operations of:
  determining facial feature points of the face in the face area;

generating a facial feature vector according to the facial feature points;

acquiring a difference value between the facial feature vector and a preset facial feature vector; and acquiring the posture information of the face according to the difference value.

17. The electronic device of claim 14, wherein the posture information comprises a deflection angle, and when selecting the target sample face image from the face image database according to the posture information, the processor is configured to execute operations of:

acquiring a sample deflection angle corresponding to each sample face image in the face image database to obtain a plurality of sample deflection angles;

selecting from the plurality of sample deflection angles a target sample deflection angle having a minimum difference with the deflection angle; and determining a sample face image corresponding to the target sample deflection angle as the target sample face image.

18. The electronic device of claim 14, wherein when correcting the local area according to the target sample face image, the processor is configured to execute operations of:

performing affine transformation on the target sample face image based on the face area to align the face area with a transformed target sample face image;

mapping the local area to the transformed target sample face image to determine a mapped area in the target sample face image; and extracting an image feature from the mapped area, and correcting the local area according to the image feature.

19. The electronic device of claim 18, wherein when extracting the image feature from the mapped area and correcting the local area according to the image feature, the processor is configured to execute the following steps:

extracting the image feature from the mapped area;

performing analysis processing on the image feature based on a preset algorithm model to acquire image feature parameters; and correcting the local area according to the image feature parameters.

20. The electronic device of claim 14, after correcting the local area according to the target sample face image, the processor is further configured to execute operations of:

determining whether a deletion instruction of a user for the corrected target image is received in a preset time period; and updating, when the deletion instruction of the user for the corrected target image is not received in the preset time period, the face image database according to the corrected target image.

* * * * *